United States Patent
Lin et al.

(10) Patent No.: US 9,389,788 B2
(45) Date of Patent: Jul. 12, 2016

(54) READING METHOD OF SOLID STATE DISK FOR IMPROVING READING SPEED AND MITIGATING READING CONGESTION

(71) Applicant: QUANTA STORAGE INC., Taoyuan County (TW)

(72) Inventors: Cheng-Yi Lin, Taoyuan County (TW); Yi-Long Hsiao, Taoyuan County (TW)

(73) Assignee: QUANTA STORAGE INC., Guishan Dist., Taoyuan (TW)

( * ) Notice: Subject to any disclaimer, the term of this patent is extended or adjusted under 35 U.S.C. 154(b) by 54 days.

(21) Appl. No.: 14/490,691

(22) Filed: Sep. 19, 2014

(65) Prior Publication Data

US 2015/0220274 A1    Aug. 6, 2015

(30) Foreign Application Priority Data

Feb. 5, 2014    (TW) .............................. 103103878 A

(51) Int. Cl.
*G06F 12/00*        (2006.01)
*G06F 3/06*         (2006.01)
*G06F 12/02*        (2006.01)

(52) U.S. Cl.
CPC .............. *G06F 3/0611* (2013.01); *G06F 3/061* (2013.01); *G06F 3/0656* (2013.01); *G06F 3/0659* (2013.01); *G06F 3/0679* (2013.01); *G06F 3/0688* (2013.01); *G06F 12/0246* (2013.01); *G06F 2003/0691* (2013.01); *G06F 2003/0692* (2013.01); *G06F 2206/1014* (2013.01)

(58) Field of Classification Search
CPC ......... G06F 12/00; G06F 3/061; G06F 11/10; G06F 12/02; G06F 2212/214; G06F 13/00; G06F 3/0628; G06F 2003/0691; G06F 2003/0692; G06F 3/0611; G06F 3/0656; G06F 3/0679; G06F 12/0246; G06F 2212/7203
USPC ......................................................... 711/103
See application file for complete search history.

(56) References Cited

U.S. PATENT DOCUMENTS

| 8,489,820 | B1* | 7/2013 | Ellard | G06F 12/0246 711/120 |
| 8,621,142 | B1* | 12/2013 | Miller | G06F 3/0611 711/103 |
| 8,972,689 | B1* | 3/2015 | de la Iglesia | G06F 3/0628 710/20 |
| 2012/0124276 | A1* | 5/2012 | Ahn | G06F 12/0246 711/103 |

* cited by examiner

*Primary Examiner* — Mardochee Chery
(74) *Attorney, Agent, or Firm* — Winston Hsu; Scott Margo

(57) ABSTRACT

The present invention is to provide a reading method of a solid state disk, receiving read requests, pre-checking the blocked state of the request queue in non-volatile memory, registering the reading request to the reading request queue if the request queue is adjudged to be unblocked, buffering the request queue if the reading request queue is adjudged to be blocked, sending a next reading request, and checking and re-sending the buffered reading request at predetermined time length in order to improve the speed of data reading.

6 Claims, 4 Drawing Sheets

READING METHOD OF SOLID STATE DISK FOR IMPROVING READING SPEED AND MITIGATING READING CONGESTION

BACKGROUND OF THE INVENTION

1. Field of the Invention

The present invention illustrates a reading method of solid state disk, and more particularly, a reading method for mitigating reading congestion.

2. Description of the Prior Art

A solid state disk (SSD) is generally several integrated non-volatile memories (NVM) and thus regarded as a single memory device. Since a solid state disk provides very rapid data transmission speed, a solid state disk becomes the major data storage device in a computer system.

Generally, the computer system sends a reading request by using a processor. The memory controller in the solid state disk receives the reading request, and then sends the reading request to each non-volatile memory unit. Each non-volatile memory unit registers the reading request in a reading request queue according to the order of sending the reading request to each non-volatile memory unit. Further, according to the reading request queue in each non-volatile memory unit and following the first-in-first-out (FIFO) rule, data in the non-volatile memory units can be read sequentially. The data in the non-volatile memory units are integrated by the memory controller and then sent to the computer system. In the following, the processor saves the reading data to a dynamic random access memory (DRAM) for backup. Thus, a solid state disk uses many first-in-first-out channels with respect to many non-volatile memory units for data transmission. By using multi-channel structure, the speed of data transmission can be improved.

However, since the size of reading request queue is limited in each non-volatile memory unit, when the reading request queue is full-loaded, the non-volatile memory unit is stopped from receiving reading request, leading to failure for receiving the reading request by a non-volatile memory unit. FIG. 1 is the conventional method of reading a solid state disk in prior art. When the memory controller in the non-volatile memory receives the reading requests, the memory controller sends the reading request to each non-volatile memory unit (step P1), and checks if the reading request is registered to each non-volatile memory unit (step P2). If the reading request is sent to a non-volatile memory unit with a full-loaded reading request queue, the non-volatile memory unit is stopped from receiving the reading request, leading to failure for receiving the reading request. In this case, the memory controller repeatedly tries to send the reading request to the non-volatile memory unit (step P3) until the reading request queue of the non-volatile memory unit is not full-loaded (i.e., the reading request queue has a space for receiving and registering the reading request) (step P4). Then, the memory controller sends the next reading request to another non-volatile memory unit (step P5), or waits for the next reading request received by the computer system (step P6).

Since the memory controller repeatedly tries to send the reading request to the non-volatile memory unit until the reading request queue of the non-volatile memory unit is not full-loaded, the reading requests corresponding to the subsequent non-volatile memory units of the solid state disk suffer from reading congestion. Thus, the reading speed of solid state disk is decreased, leading the performance degradation. Thus, it is important to develop an efficient reading method in solid state disk.

SUMMARY OF THE INVENTION

In an embodiment of the present invention, a reading method for a solid state disk is disclosed. The method includes pre-checking the reading request queue of each non-volatile memory unit, buffering the reading requests to the demand staging area if the reading requests suffer from reading congestion, sending a subsequent reading request to the corresponding non-volatile memory units with no reading congestion.

In another embodiment of the present invention, a reading method for a solid state disk is disclosed. The method includes starting the time countdown process with a fixed time length K for detecting the reading requests in the demand staging area, re-sending the reading requests to the corresponding non-volatile memory units if no reading congestion is occurred.

In order to achieve the purpose of the invention illustrated above, the reading method of solid state disk of the present invention pre-checks the block state of the reading request queue in each non-volatile memory unit. When no reading congestion is detected, the reading request is registered to the reading request queue. When reading congestion is detected, the reading request is buffered and the next reading request is sent to the corresponding non-volatile memory unit. The buffered reading request is periodically checked by using a predetermined time interval and is re-sent to the corresponding non-volatile memory unit for improving reading speed of solid state disk.

In the reading method of solid state disk of the present invention, the memory controller receives the reading requests from the host and then prepares to send the reading requests to the non-volatile memory units of solid state disk. The memory controller pre-checks the block state of the reading request queue in each non-volatile memory unit. When reading congestion is detected, the reading request is buffered to the demand staging area of solid state disk. A time countdown process with a fixed time length is performed for periodically detecting the reading request in the demand staging area, wherein the fixed time length is greater than an average time length of sending reading requests to ensure that the buffered space is released from the reading request queue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
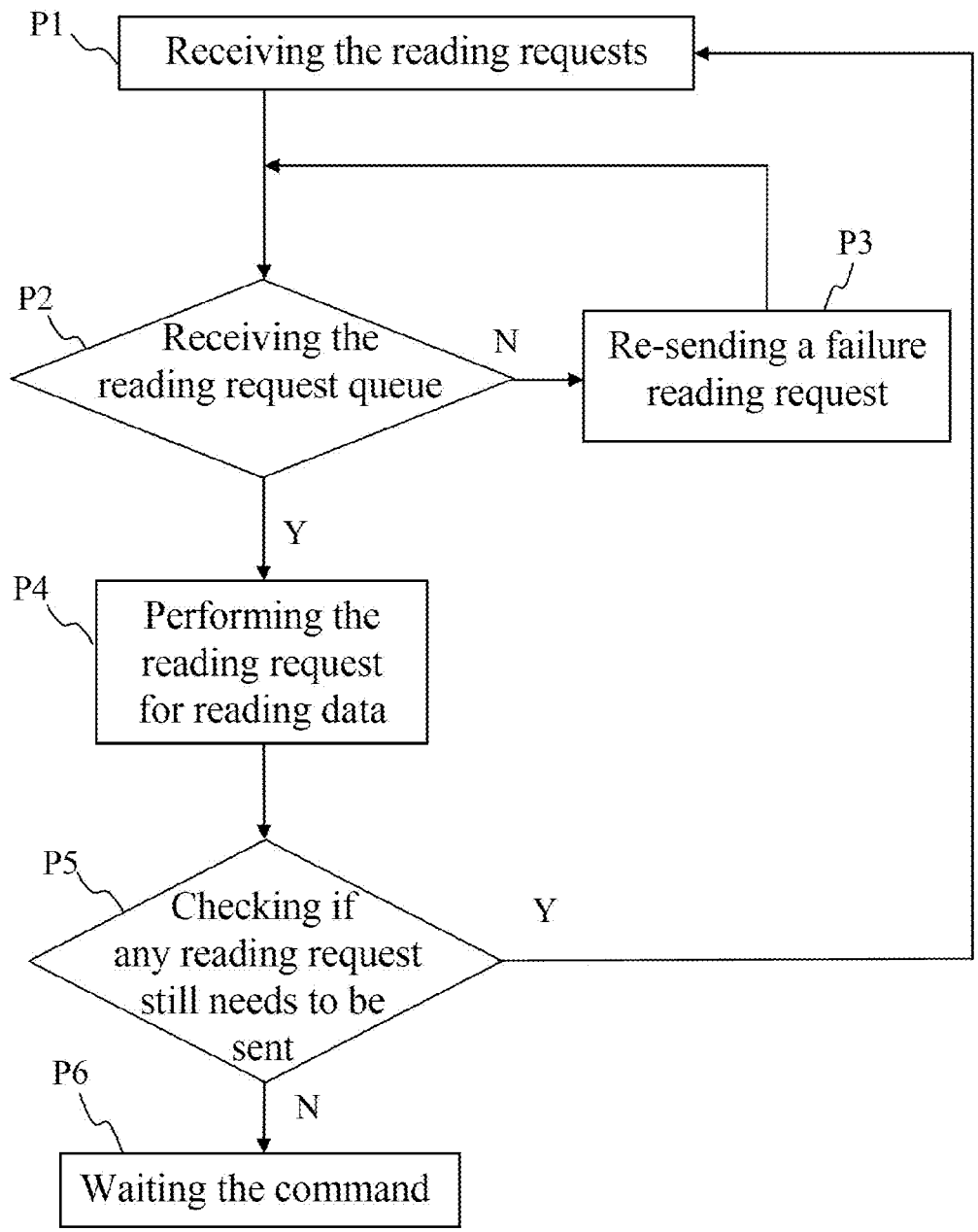
FIG. 1 is a flow chart of reading method in a solid state disk in prior art.
Figure 2:
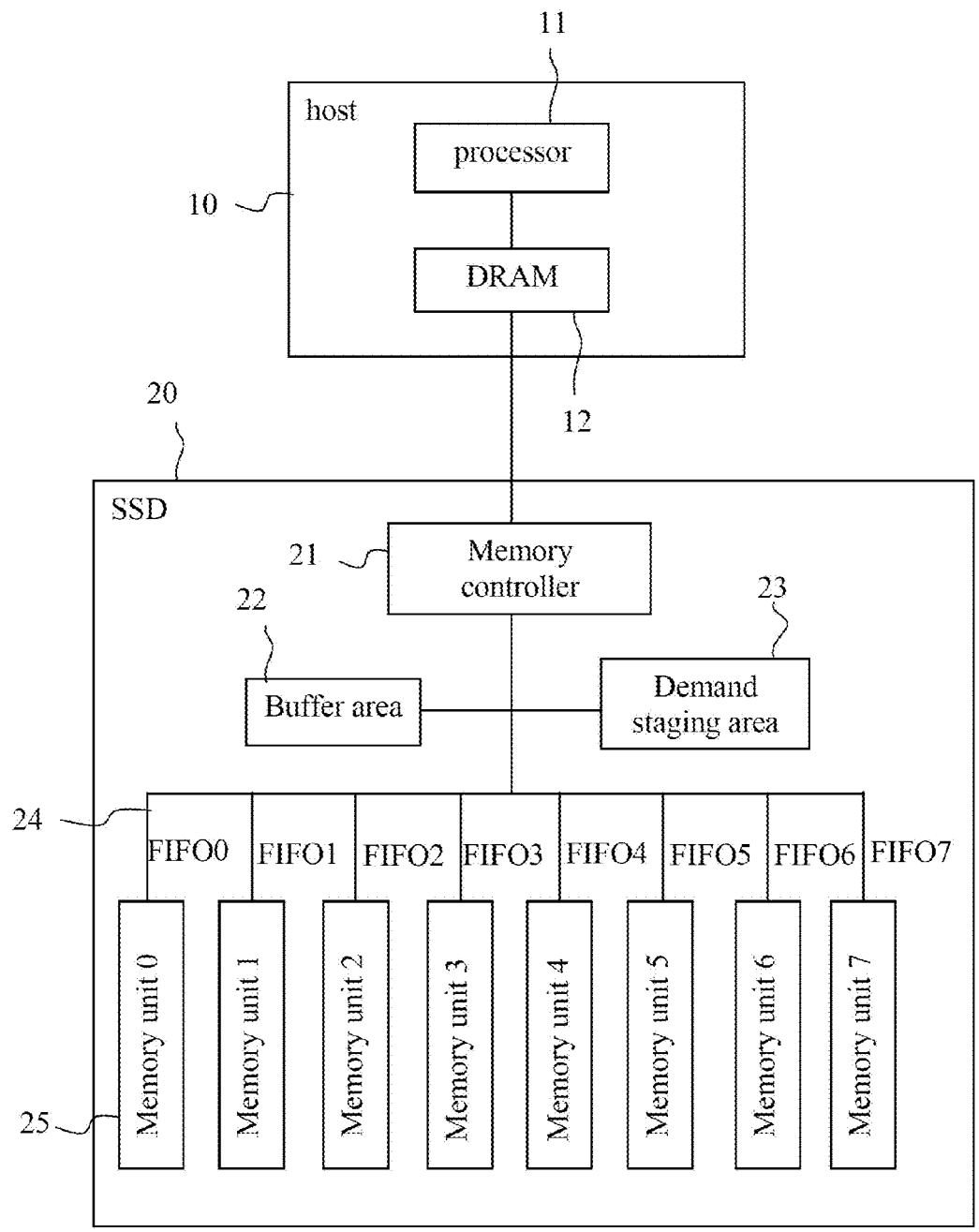
FIG. 2 is a schematic block diagram of the solid state disk according to the embodiment of the present invention.
Figure 3:
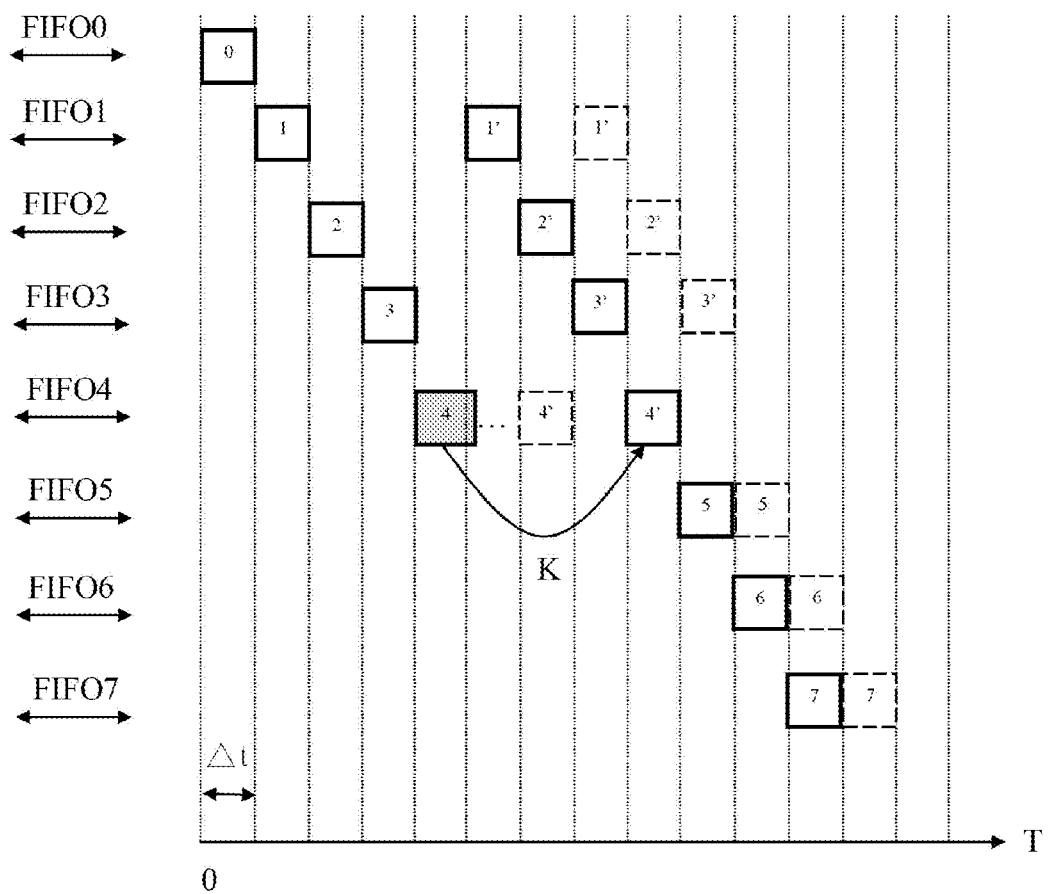
FIG. 3 is an illustration of the process of reading method in a solid state disk according to the embodiment of the present invention.

FIG. 2 is a schematic block diagram of the solid state disk 20 according to the embodiment of the present invention. FIG. 3 is an illustration of the process of data reading in a solid state disk 20. In FIG. 2, a processor 11 in host 10 sends reading requests. A dynamic random access memory 12 temporarily saves the reading requests for backup. In the embodiment, the solid state disk 20 is coupled to host 10. The memory controller 21 in the solid state disk 20 controls a plurality of non-volatile memory units 25 and integrates the non-volatile memory units 25 to a single storage device by the buffer region 22 and demand staging area 23. Here, each non-volatile memory unit 25 is coupled to a first-in-first out channel 24. In the embodiment, solid state disk 20 includes eight non-volatile memory units 25 (i.e., memory unit 0 to memory unit 7), but not be limited thereto. In other embodiment, solid state disk 20 includes an arbitrary number of non-volatile memory units 25. Further, the demand staging area 23 can be a segment within the buffer region 22, or can be separated from the buffer region 22.

By sending the reading requests from the processor 11, the memory controller 21 in the solid state disk 20 receives the reading requests. Then, the memory controller 21 sends the reading requests to the corresponding non-volatile memory unit 25 sequentially according to a reading request sequence, wherein the reading request sequence denotes the order of reading request to be sent to each non-volatile memory unit 25. Further, according to the reading request queue in each non-volatile memory unit 25 and following the first-in-first-out (FIFO) rule, the data in non-volatile memory unit 25 can be read sequentially. In the following, the data in each non-volatile memory unit 25 is sent to the buffer region 22 through the corresponding first-in-first-out channel 24. The memory controller 21 integrates the data and sends the data to the host 10. The processor 11 saves the data in the dynamic random access memory 12 for backup.

To prevent the reading request queue of the non-volatile memory unit 25 from being full-loaded so that the non-volatile memory unit is stopped from receiving the reading request and suffers from reading congestion, a new reading method is proposed in the invention as described below. Here, the memory controller 21 performs a pre-check process on the reading request queue of each non-volatile memory unit 25 in order to check if the reading request queue is full-loaded that leads to reading congestion. Then, the memory controller 21 sends the reading request to the non-volatile memory unit 25 having no reading congestion (i.e., the reading request queue is not full-loaded), and registers the reading request to the corresponding reading request queue. Besides, the memory controller 21 buffers the reading request of the non-volatile memory unit 25 having reading congestion (i.e., the reading request queue is full-loaded) to the demand staging area 23, and sends the next reading request with no reading congestion to another non-volatile memory unit 25. By doing so, the solid state disk 20 can avoid information loss of a reading request sent to the non-volatile memory unit 25 with reading congestion. The reading congestion of the next reading request is also avoided (i.e., because no congestion propagation is occurred). For processing the reading request buffered in the demand staging area 23, the memory controller 21 checks the block state of the reading request queue in each non-volatile memory unit 25 at a fixed time interval. When the memory controller 21 detects the reading request queue is full-loaded (reading congestion is occurred), the memory controller 21 continues to buffer the reading request to the demand staging area 23. When the memory controller 21 detects the reading request queue is not full-loaded (no reading congestion), the memory controller 21 sends the reading request from the demand staging area 23 to the corresponding non-volatile memory units 25, and registers the reading request to the corresponding reading request queue. Here, the fixed time interval for checking the block state of the reading request queue is set to at least one time of the average time length for sending reading requests. The appropriate time length can be used to avoid the reading request queue being detected with high frequency.

FIG. 3 is an illustration of the process of reading method in a solid state disk 20 according to the embodiment of the present invention. In FIG. 3, host 10 sends a reading request sequence A as 0-1-2-3-4-4'-1'-2'-3'-5-6-7. A memory controller 21 receives the reading request sequence A. At time T=0, the reading requests are sent sequentially. Specifically, before the reading request 0 is sent to $0^{th}$ non-volatile memory unit 25, the reading request queue of the $0^{th}$ non-volatile memory unit 25 is checked. If no data reading congestion is detected, the reading request 0 is registered to the reading request queue of $0^{th}$ non-volatile memory unit 25. The $0^{th}$ non-volatile memory unit 25 reads the data according to the reading request 0, and sends out the data through a first-in-first out channel FIFI0. Then, the memory controller 21 checks the reading request queue of $1^{st}$ non-volatile memory unit 25 during a time interval At before the reading request 1 is sent to the $1^{th}$ non-volatile memory unit 25. If no reading congestion is detected, the reading request 1 is registered to the reading request queue of $1^{th}$ non-volatile memory unit 25. The $1^{th}$ non-volatile memory unit 25 reads the data according to the reading request 1, and sends out the data through a first-in-first out channel FIFI1. Similarly, the memory controller 21 sends the reading request 2, reading request 3, and reading request 4 to the corresponding non-volatile memory units 25 according to the reading request sequence A illustrated in FIG. 3.

The memory controller 21 continues to send reading request 4'. For example, without checking the reading request queue of $4^{th}$ non-volatile memory units 25, when the memory controller 21 sends the reading request 4' to a $4^{th}$ non-volatile memory unit 25, since the reading request queue of $4^{th}$ non-volatile memory unit 25 is full-loaded, the $4^{th}$ non-volatile memory unit 25 is stopped from receiving the reading request 4'. In this case, if the memory controller 21 ignores sending the reading request 4', the information of reading request 4' will be lost. Thus, if the memory controller 21 is conventional, the memory controller 21 repeatedly tries to send the reading request 4' during several time intervals Δt until the reading request queue of $4^{th}$ non-volatile memory unit 25 is not full-loaded and can receive the reading request 4'. The delay of reading request 4' can be illustrated in the dotted line of reading request 4' in FIG. 3. As a result, the consequent reading requests 1'-2'-3'-5-6-7 must be delayed (i.e., delay propagation), illustrated as the dotted lines in FIG. 3. The speed of reading in solid state disk 20 is decreased.

To improve the speed of reading, the reading method of the solid state disk 20 in the present invention uses the memory controller 21 to pre-check the block state of reading request queue of $4^{th}$ non-volatile memory unit 25. When the reading request queue of $4^{th}$ non-volatile memory unit 25 is full-loaded, the memory controller 21 buffers the reading request 4' to the demand staging area 23, and starts a time countdown process with a fixed time length K for detecting the reading request 4' in the demand staging area 23. Then, the memory controller 21 pre-checks the reading request queue of the $1^{st}$ non-volatile memory unit 25 before the reading request 1' is sent to the $1^{st}$ non-volatile memory unit 25. When the reading request queue of the $1^{th}$ non-volatile memory unit 25 is not full-loaded (no reading congestion), the reading request 1' is registered to the reading request queue of the $1^{th}$ non-volatile memory unit 25. Similarly, reading request 2' and reading request 3' are sent to the corresponding reading request queue for data reading when no reading congestion is detected.

When the fixed time length K has been completely counted, the memory controller 21 checks the reading request 4' in the demand staging area 23, and re-checks the reading request queue of the 4$^{th}$ non-volatile memory unit 25. When the reading request queue of the 4$^{th}$ non-volatile memory unit 25 is not full-loaded (no reading congestion), the memory controller 21 re-sends the reading request 4' to the 4$^{th}$ non-volatile memory unit 25 after sending the reading request 3' to 3$^{th}$ non-volatile memory unit 25. When the reading request queue of the 4$^{th}$ non-volatile memory unit 25 is full-loaded (reading congestion is occurred), the reading request 4' is still buffered in the demand staging area 23 for waiting the next time length K. The memory controller 21 re-checks the reading request queue of the 4$^{th}$ non-volatile memory unit 25 after the next time length K for determining if the reading request 4' is sent to the 4$^{th}$ non-volatile memory unit 25. In this case, the sequence for sending reading requests can be written by 1'-2'-3'-4'-5-6-7, as illustrated in FIG. 3. As a result, reading request 5, reading request 6, and reading request 7 are respectively sent to the corresponding memory units and respectively registered to the reading request queues of the corresponding memory units.

Figure 4:
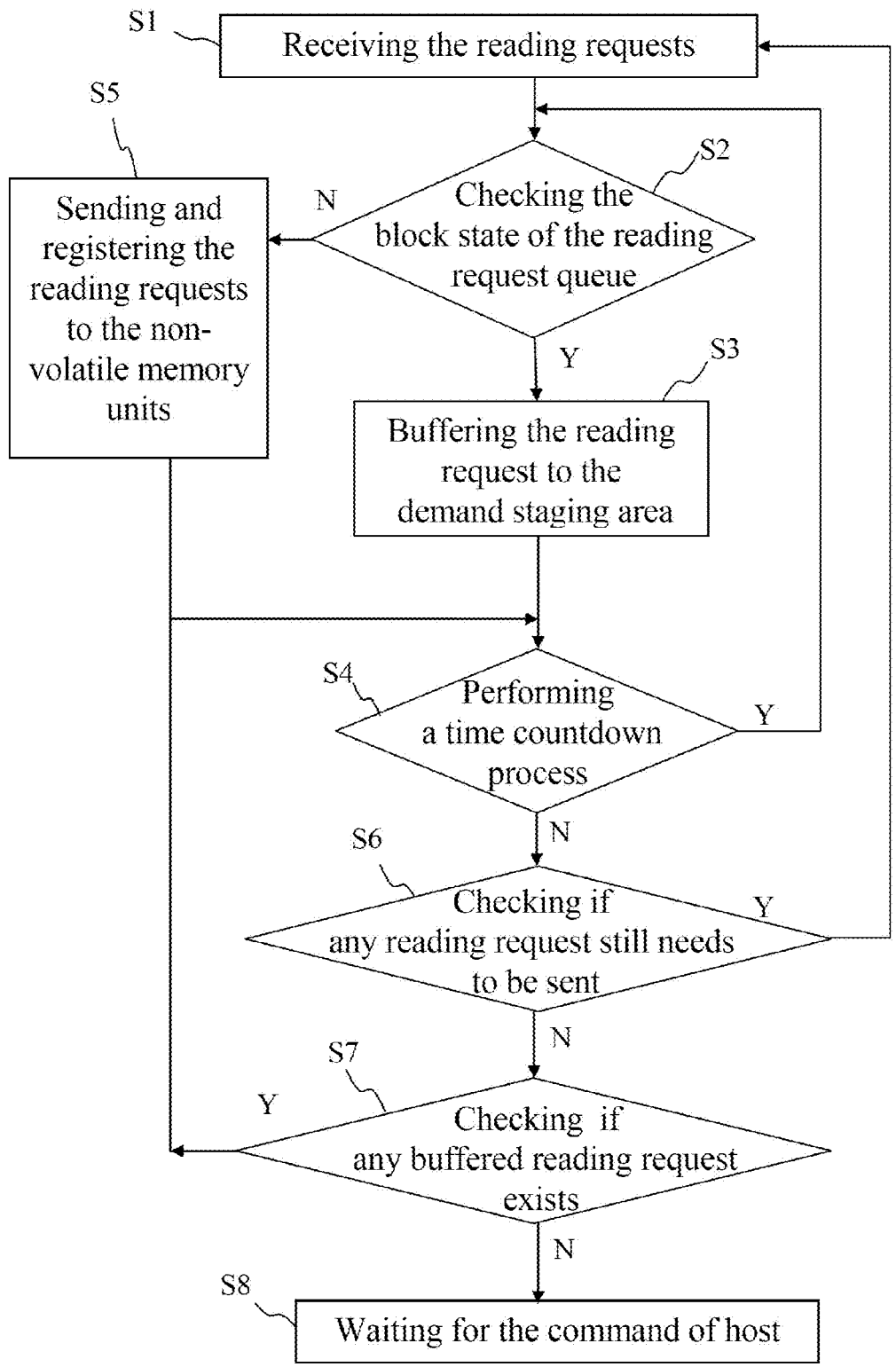
FIG. 4 is a flow chart of reading method in a solid state disk according to the embodiment of the present invention.

FIG. 4 is a flow chart of reading method in a solid state disk 20 according to the embodiment of the present invention. As shown in FIG. 4, four steps S1 to S4 are introduced for a reading method. In step S1, the memory controller 21 in the solid state disk 20 prepares to send the reading requests to the non-volatile memory units 25 in the solid state disk 20 according to the reading request sequence. In step S2, the memory controller 21 pre-checks the states of the reading request queue in each non-volatile memory unit 25 before the memory controller 21 sends the reading requests to the non-volatile memory units 25. When the reading request queue is full-loaded that reading congestion is detected in step S3, the memory controller 21 saves the reading request to the demand staging area 23 in the solid state disk 20 and then goes to step S4. When the reading request queue is not full-loaded that no reading congestion is detected, the memory controller 21 performs the reading process in step S5. In step S5, the memory controller 21 sends the reading requests to the non-volatile memory units 25. After performing step S5, the memory controller 21 performs the reading process in step S4.

In step S4, the memory controller 21 starts a time countdown process with a fixed time length K for detecting the reading requests in the demand staging area 23. When the fixed time length K has been completely counted, the reading process goes back to step S2 for re-detecting the reading request queue. When the fixed time length K is still under-counted, the reading process proceeds to step S6 for detecting if any reading request have to be sent. If the reading request is detected, the reading process goes back to step S1 for sending a next reading request. If no reading request is detected, the reading process proceeds to step S7 for checking if any reading request exists in the demand staging area 23. If the reading request is detected in the demand staging area 23, the reading process goes back to step S4 and continues the time countdown process. If no reading request is detected in the demand staging area 23, it implies that the reading requests are completely sent to the non-volatile memory units 25. The reading process proceeds to step S8 for waiting the command of the host 10.

To sum up, the reading method of the present invention uses the pre-check process to the reading request queue of each non-volatile memory unit. When the reading request queue of non-volatile memory unit is full-loaded, the memory controller buffers the reading request to the demand staging area to avoid reading congestion and then sends a next reading request to another non-volatile memory unit. Further, the reading method uses a time countdown process with fixed time length for checking the block state of reading requests in the demand staging area and re-sends the reading requests with no reading congestion. Thus, the reading speed of solid state disk can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reading method of a solid state disk comprising:
   (1) receiving reading requests;
   (2) checking a block state of a reading request queue of each non-volatile memory unit, if a reading congestion is detected, buffering a corresponding reading request, and if no reading congestion is detected, sending the corresponding reading request and then registering the reading request to the reading request queue of non-volatile memory unit;
   (3) when the corresponding reading request is buffered, performing a time countdown process with a fixed time length, after the time countdown process is performed, when the fixed time length has been completely counted, going back to step (2) for re-checking the buffered reading requests;
   (4) when the fixed time length is still under-counted, checking if any reading request still needs to be sent, when at least one reading request still needs to be sent, sending a next reading request of the at least one reading request to the corresponding non-volatile memory unit; and
   (5) when no reading request needs to be sent, checking if any buffered reading request exists, when at least one buffered reading request is detected, going back to step (3) for waiting to check the buffered reading requests, and when no buffered reading request is detected, waiting for a next command.

2. The method of claim 1, further comprising receiving the reading requests from a host by a memory controller in the solid state disk, and preparing to send the reading requests to corresponding non-volatile memory units.

3. The method of claim 2, wherein the step (2) denotes that the memory controller pre-checks the block state of the reading request queue of each non-volatile memory unit before the memory controller sends the reading requests to the corresponding non-volatile memory units.

4. The method of claim 2, wherein the reading requests are buffered to a demand staging area in the solid state disk.

5. The method of claim 4, wherein performing the time countdown process with the fixed time length is to use the time countdown process with the fixed time length for checking the reading requests buffered in the demand staging area.

6. The method of claim 5, wherein the fixed time length is greater than an average time length of sending reading requests.

* * * * *